(12) United States Patent
Nagano et al.

(10) Patent No.: US 7,661,347 B2
(45) Date of Patent: Feb. 16, 2010

(54) SAW BLADE (75) Inventors: Yuji Nagano, Kanagawa (JP); Iwao Kamiyama, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 10/530,415

(22) PCT Filed: Oct. 9, 2003

(86) PCT No.: PCT/JP03/12990

§ 371 (c)(1),
(2), (4) Date: Apr. 7, 2005

(87) PCT Pub. No.: WO2004/033138

PCT Pub. Date: Apr. 22, 2004

(65) Prior Publication Data

US 2006/0162526 A1 Jul. 27, 2006

(30) Foreign Application Priority Data

Oct. 10, 2002 (JP) .............................. 2002-297928

(51) Int. Cl.
*B27B 33/06* (2006.01)
*B27B 33/08* (2006.01)
(52) U.S. Cl. .......................................... 83/835; 83/846
(58) Field of Classification Search ........... 83/835–855; 30/355
See application file for complete search history.

(56) References Cited

U.S. PATENT DOCUMENTS

| 2,637,355 | A | * | 5/1953 | Chapin ......................... 83/850 |
| 2,849,037 | A | * | 8/1958 | Wright .......................... 83/852 |
| 3,973,455 | A | * | 8/1976 | Slaats et al. .................... 83/846 |
| 4,827,822 | A | * | 5/1989 | Yoshida et al. ................. 83/835 |
| 5,477,763 | A | * | 12/1995 | Kullman ....................... 83/846 |
| 6,520,722 | B2 | * | 2/2003 | Hopper et al. ................. 83/846 |
| 6,532,852 | B1 | * | 3/2003 | Tsujimoto et al. ............. 83/848 |
| 2002/0184981 | A1 | * | 12/2002 | Tsujimoto .................... 83/846 |
| 2003/0010177 | A1 | * | 1/2003 | Cook et al. .................... 83/835 |
| 2004/0035282 | A1 | | 2/2004 | Tsujimoto |

FOREIGN PATENT DOCUMENTS

JP          58-22623          2/1983

(Continued)

OTHER PUBLICATIONS

English Language Abstract of JP 10-193219.

(Continued)

*Primary Examiner*—Stephen Choi
(74) *Attorney, Agent, or Firm*—Greenblum & Bernstein P.L.C.

(57) ABSTRACT

A saw blade includes left and right set teeth which are set in a lateral direction, as viewed in a cuffing direction of cutting teeth. The left and right set teeth include dovetail shaped set teeth, each having a tooth tip formed into a dovetail shape gradually enlarged in the lateral direction, respectively; and a straight tooth, which is not set. The straight tooth includes a dovetail shaped straight tooth having a tooth tip formed into a dovetail shape gradually enlarged in the lateral direction. In the straight tooth, inclinations are formed on both of left and right ends at the tooth tip, which is formed into the dovetail shape gradually enlarged in the lateral direction.

8 Claims, 10 Drawing Sheets

FOREIGN PATENT DOCUMENTS

| | | |
|---|---|---|
| JP | 7-116915 | 5/1995 |
| JP | 7-323403 | 12/1995 |
| JP | 10-193219 | 7/1998 |
| JP | 2000-317729 | 11/2000 |
| WO | 99/32251 | 7/1999 |

OTHER PUBLICATIONS

English Language Abstract of JP 2000-317729.
English Language Abstract of JP 58-22623.
English Language Abstract of JP 7-116915.
English Language Abstract of JP 7-323403.

\* cited by examiner

SAW BLADE

TECHNICAL FIELD

The present invention relates to a saw blade and, more particularly, to a saw blade including a dovetail shaped set tooth having left and right set teeth, which are set on left and right sides and whose tooth tips are formed into a dovetail shape gradually enlarged in a lateral direction.

BACKGROUND ART

In conventional manner, in the case where a metallic workpiece, for example, is cut, saws such as a circular saw and a band saw have been widely used in the prior art. A saw blade serving as a cutting tool for use in the above-described saw is configured such that numerous cutting teeth for cutting the workpiece are arranged at appropriate pitches. Exemplary types of saw blades include a so-called set tooth type and a dovetail shaped set tooth type.

The above-described set tooth is provided with a straight tooth, as viewed in a cutting direction of the cutting teeth, and left and right set teeth whose tooth tips are set in a lateral direction in order to perform a setting work in the lateral direction. Chattering vibration, noise or the like generated during a cutting work of the workpiece has been coped with by designing an arrangement pattern of the appropriate number of straight teeth and the plurality of left and right set teeth in any one of various kinds of patterns such as a raker set, a wave set and a straight set or arranging the cutting teeth at unequal pitches.

The above-described dovetail shaped set tooth type is not provided with left and right set teeth which are set in the lateral direction, but is provided at each of the cutting teeth with a dovetail shaped chip which is gradually enlarged in the lateral direction on a tooth tip side, wherein the chip may have various shapes and dimensions, as disclosed in, for example, Japanese Patent Application Laid-open Nos. 10-193219 and 2000-317729.

Figure 10:
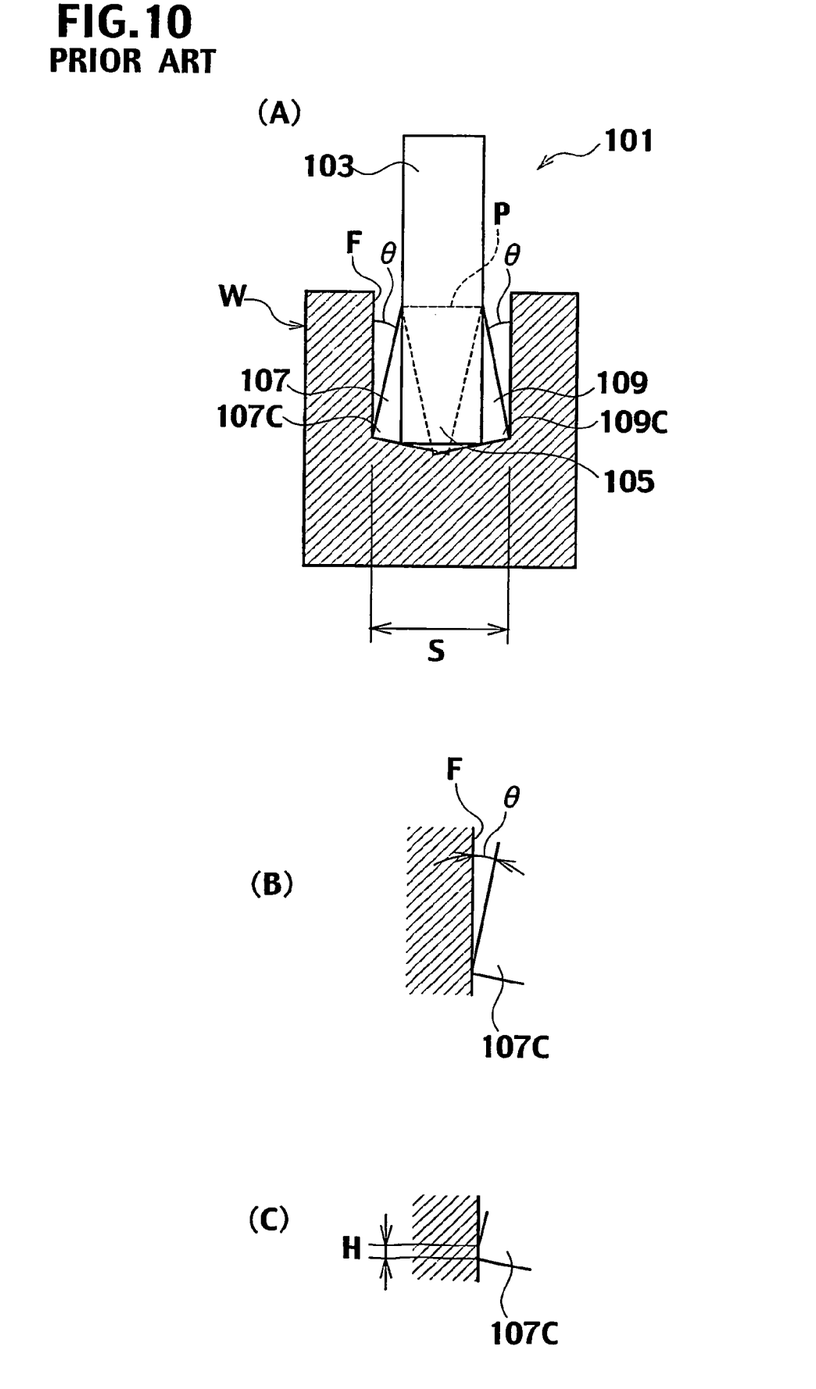
FIGS. 10A, 10B and 10C are views explanatory of the configuration of a typical saw blade in the prior art.

As shown in FIGS. 10A to 10C, a conventional saw blade 101 of the set type includes a blade base 103, which is provided with a straight tooth 105 without setting in a lateral direction, as viewed in a cutting direction of a workpiece W by means of the saw blade 101, and left and right set teeth 107 and 109, which are set in the lateral direction. With the above-described configuration, the thicknesses of the straight tooth 105 and the left and right set teeth 107 and 109 are equal to the thickness of the blade base 103.

If a setting quantity, that is, a scarf width S of the left and right set teeth 107 and 109 is small in the above-described saw blade 101, an inclination angle θ of each of the left and right set teeth 107 and 109 becomes small in a vertical direction. Therefore, if respective outside corners 107C and 109C of the left and right set teeth 107 and 109 are finely abraded in a horizontal direction, a vertical dimension H at the abraded portion becomes relatively larger than an abrasion quantity in the horizontal direction. An inner surface F of a cutting groove formed at the workpiece W is brought into larger contact with the abraded portion at the left or right set tooth 107 or 109.

When the workpiece W is cut by the saw blade 101, the left and right set teeth 107 and 109 are elastically deformed in the lateral direction with the application of partial force in the lateral direction. As described above, when the inner surface F of the cutting groove formed at the workpiece is brought into larger contact with the abraded portion at the left or right set tooth 107 or 109, cutting resistance becomes larger, and further, the partial force in the lateral direction exerted on the left and right set teeth 107 and 109 becomes larger. As a consequence, the saw blade 101 is turned into an unstable state, thereby inducing breakage or bending.

In view of this, if the inclination angle θ of each of the left and right set teeth 107 and 109 is to be increased by making constant the scarf width S, i.e., a cutting margin in cutting the workpiece W, a bending position P, at which the left and right set teeth 107 and 109 are bent in the lateral direction, undesirably approaches the tooth tips. In this case, since a fine portion in the vicinity of the tip of the cutting tooth in the saw blade 101 is deformed in the lateral direction with application of lateral large force, the tip of the cutting tooth is largely deformed, i.e., crushed, thereby raising a problem.

In the meantime, the saw blade of the dovetail shaped set tooth type is not provided with left and right set teeth, which are set in a lateral direction, but it is generally configured such that a chip having a trapezoidal shape (i.e., a dovetail shape) in cross section is joined to a tip of a straight tooth without setting in the lateral direction. Here, if an inclination angle of a side surface of the chip portion is to be increased, the bottom side of the trapezoid becomes longer, thereby providing an undesirable configuration in which the chip becomes larger and cutting resistance becomes larger.

The invention has been accomplished to solve the above-described problems experienced in the prior art. Therefore, an object of the invention is to provide a saw blade in which a vertical dimension can be suppressed to a low level in view of a horizontal abrasion quantity at an outside corner of each of left and right set teeth.

DISCLOSURE OF THE INVENTION

In order to achieve the above-described object, a saw blade according to the invention based on a first aspect provided with numerous cutting teeth for cutting a workpiece at appropriate pitches, comprises: left and right set teeth, which are set in a lateral direction, as viewed in a cutting direction of the cutting teeth; each of the left and right set teeth being a dovetail shaped set tooth having a tooth tip, which is formed into a dovetail shape gradually enlarged in the lateral direction in the above-described configuration.

A saw blade according to the invention based on a second aspect further comprises: a straight tooth, which is not set in the lateral direction, as viewed in the cutting direction of the cutting teeth; the straight tooth including a dovetail shaped straight tooth having a tooth tip, which is formed into a dovetail shape gradually enlarged in the lateral direction, in the above-described configuration in the first aspect.

A saw blade according to the invention based on a third aspect further comprises: a straight tooth, which is not set in the lateral direction, as viewed in the cutting direction of the cutting teeth; the straight tooth including a bevel-dovetail shaped straight tooth having inclinations at both of left and right ends of a tooth tip, which is formed into a dovetail shape gradually enlarged in the lateral direction, in the above-described configuration in the first aspect.

A saw blade according to the invention based on a fourth aspect further comprises: a straight tooth, which is not set in the lateral direction, as viewed in the cutting direction of the cutting teeth; wherein in the above-described configuration, the straight tooth includes a dovetail shaped straight tooth having a tooth tip, which is formed into a dovetail shape gradually enlarged in the lateral direction, and a bevel-dovetail shaped straight tooth having inclinations at both of left and right ends of a tooth tip, which is formed into a dovetail shape gradually enlarged in the lateral direction; and a height of the dovetail shaped straight tooth is smaller than or substantially equal to that of the bevel-dovetail shaped straight tooth in the first aspect.

In a saw blade according to the invention based on a fifth aspect, a height of each of the left and right set teeth is smaller than or substantially equal to that of the straight tooth in any one of the second to fourth aspects.

In a saw blade according to the invention based on a sixth aspect, an inclination is formed at an inside corner on a tooth tip side of each of the left and right set teeth in any one of the second to fifth aspects.

In a saw blade according to the invention based on a seventh aspect, the cutting teeth are configured by joining a dovetail shaped chip to the tip end of the tooth in a blade base; and the thickness of the chip at the joint portion is made to be smaller than that of the tip end of the tooth in any one of the first to sixth aspects.

Since the invention provides the configuration in which the left and right set teeth including the dovetail shaped set teeth, each having the tip formed into the dovetail shape gradually enlarged in the lateral direction, the inclination angle at the side surface of each of the left and right set teeth with respect to the vertical direction can be increased by combining the inclination angle of the dovetail shape with the inclination angle in setting in the lateral direction.

Consequently, it is possible to suppress a vertical dimension to a low level in view of a horizontal abrasion quantity at the outside corner of each of the left and right set teeth, thus solving the above-described problems experienced by the prior art.

BEST MODE FOR CARRYING OUT THE INVENTION

A description will be given below of saw blades in preferred embodiments according to the invention in reference to the attached drawings.

Figure 1:
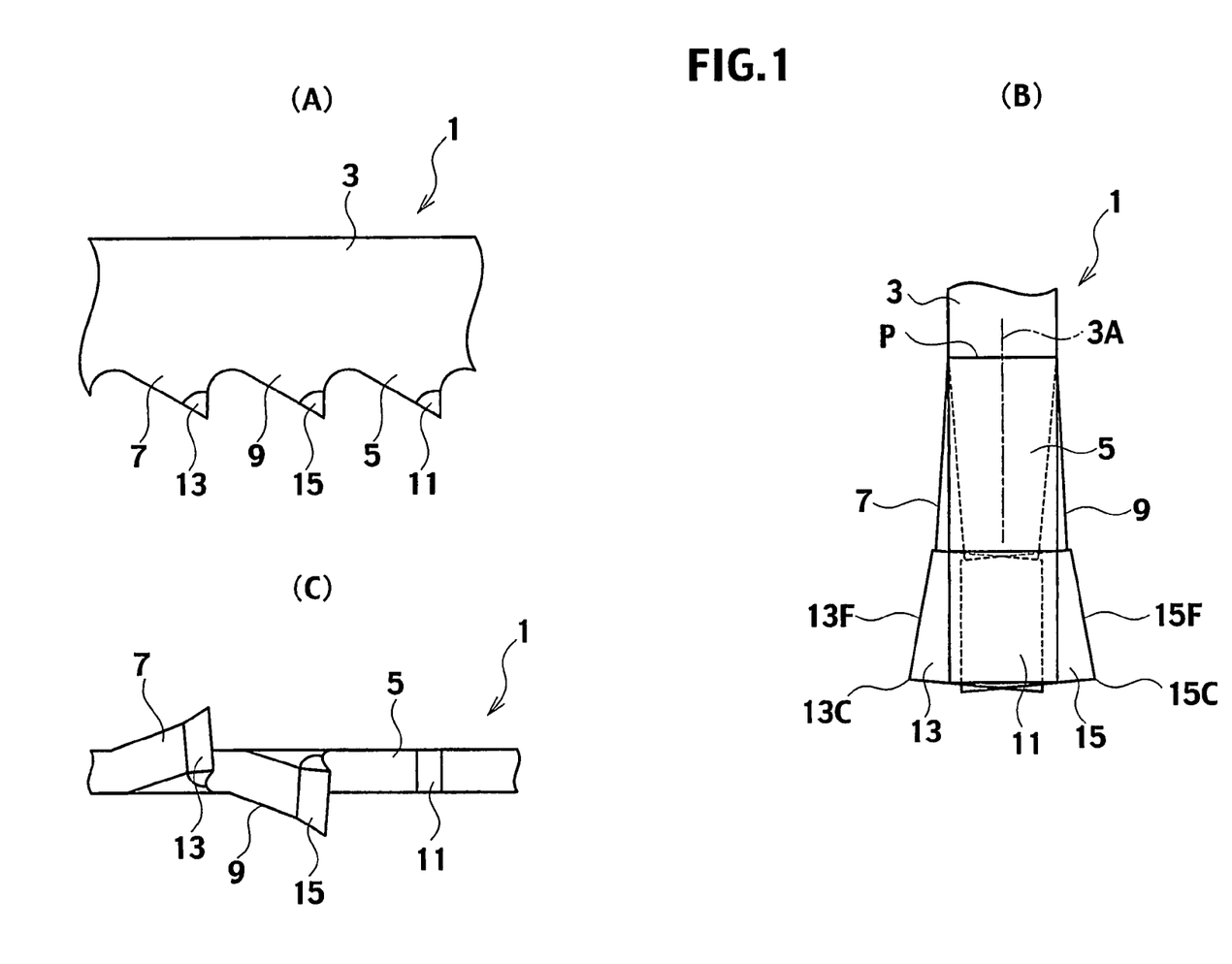
FIGS. 1A, 1B and 1C are views explanatory of a saw blade in a first preferred embodiment according to the invention.

Referring to FIGS. 1A to 1C, a saw blade 1 in a first preferred embodiment according to the invention includes a blade base 3 made of a highly resilient material such as a spring steel. At the blade base 3 are formed numerous cutting teeth for cutting a workpiece (which is not shown in FIGS. 1A to 1C) at appropriate pitches. The cutting teeth include a straight tooth 5, which precedes in a cutting direction (i.e., rightward in FIG. 1A) in cutting the workpiece, serving as a preceding tooth, and further, left and right set teeth 7 and 9 serving as subsequent teeth, which are subsequent to the straight tooth 5.

The straight tooth 5 is a straight saw tooth, which is not set in a lateral direction, as viewed in the cutting direction of the saw blade 1 with respect to the workpiece. In contrast, the left and right set teeth 7 and 9 are saw teeth, which are inclined by setting in the lateral direction, as viewed in the cutting direction (i.e., in the lateral direction in FIG. 1B, wherein the terms "left and right" and "the lateral direction" are hereinafter used as synonyms signifying the same direction). The height of the straight tooth 5 is designed to become substantially equal to that of each of the left and right set teeth 7 and 9.

The thicknesses of the straight tooth 5 and the left and right set teeth 7 and 9 are equal to that of the blade base 3. Chips 11, 13 and 15 on the tooth tips are fixed integrally with the straight tooth 5 and the left and right set teeth 7 and 9, respectively. The chips 11, 13 and 15 on the tooth tips are made of, for example, a cemented carbide steel, a high-speed tool steel or the like, and further, are welded by electron-beam welding or the like.

The thickness of the chip 11 on the tooth tip formed at the straight tooth 5 is designed to be substantially equal to that of the blade base 3. As a consequence, the straight tooth 5 is formed in a straight saw tooth without any inclination in the lateral direction, as shown in FIG. 1B.

The chips 13 and 15 on the tooth tips formed at the left and right set teeth 7 and 9, respectively, have the tooth tips, which are formed into a dovetail shape gradually enlarged in the lateral direction (i.e., downward in FIG. 1B), as shown in FIG. 1B. In other words, the lateral thicknesses on the tooth tips are greater than those at the portions welded to the left and right set teeth 7 and 9, thereby exhibiting a trapezoidal shape (i.e., the dovetail shape) in cross section. Consequently, the left and right set teeth 7 and 9 include the dovetail shaped chips 13 and 15 on the tooth tips, respectively, thus providing the configuration of dovetail shaped set teeth.

As is understood from the above-described configuration, respective left and right side surfaces 13F and 15F of the chips 13 and 15 on the tooth tips are inclined in the vertical direction (i.e., in a width direction of the saw blade 1) in such a manner that a welding side, that is, an upper side approaches a center 3A in the thickness of the blade base 3 even in a state before setting the left and right set teeth 7 and 9. Thereafter, when the left and right set teeth 7 and 9 are allowed to be set at a bending position P in the lateral direction, the left and right set teeth 7 and 9 are inclined outward in the lateral direction in such a manner that the tooth tips (i.e., lower portions) are separated from the center 3A in the thickness in the vertical direction in FIG. 1B, that is, in the width direction of the blade base 3.

Thus, even if an inclination angle when the left and right set teeth 7 and 9 are set in the lateral direction is equal to that in the prior art, the inclination angle is summed up with the inclination angles of the side surfaces 13F and 15F of the chips 13 and 15 on the tooth tips owing to the dovetail shape of each of the chips 13 and 15 on the tooth tips, so that the inclination angle of each of the side surfaces 13F and 15F of the chips 13 and 15 on the tooth tips disposed at the left and right set teeth 7 and 9 in the vertical direction becomes greater than the inclination angle obtained after setting the left and right set teeth 7 and 9.

Therefore, it is possible to suppress an increase in abrasion upward and downward (i.e., in the vertical direction) even in the case where horizontal (i.e., lateral) abrasion occurs at outside corners 13C and 15C of the chips 13 and 15 on the tooth tips disposed at the left and right set teeth 7 and 9, respectively. That is to say, it is possible to suppress an increase in cutting resistance due to the abrasion occurring at the outside corners 13C and 15C of the chips 13 and 15 on the tooth tips and an unstable state of the saw blade 1 caused by an increased partial force in the lateral direction, thus prolonging the lifetime of the saw blade and solving the above-described problems experienced by the saw blade in the prior art.

As has been already understood, the inclination angle of the side surface in the vertical direction in setting becomes great by forming the respective side surfaces 13F and 15F of the chips 13 and 15 on the tooth tips into the inclined trapezoidal shape (i.e., the dovetail shape) in advance. Thus, the dovetail shape can be formed by merely inclining the side surface on a setting side at a predetermined angle in advance. In other words, the side surface opposite to the side surface on the setting side may be formed into, for example, a vertical shape. Namely, the dovetail shape may be asymmetric between the side surface on the setting side and the opposite side surface.

Figure 2:
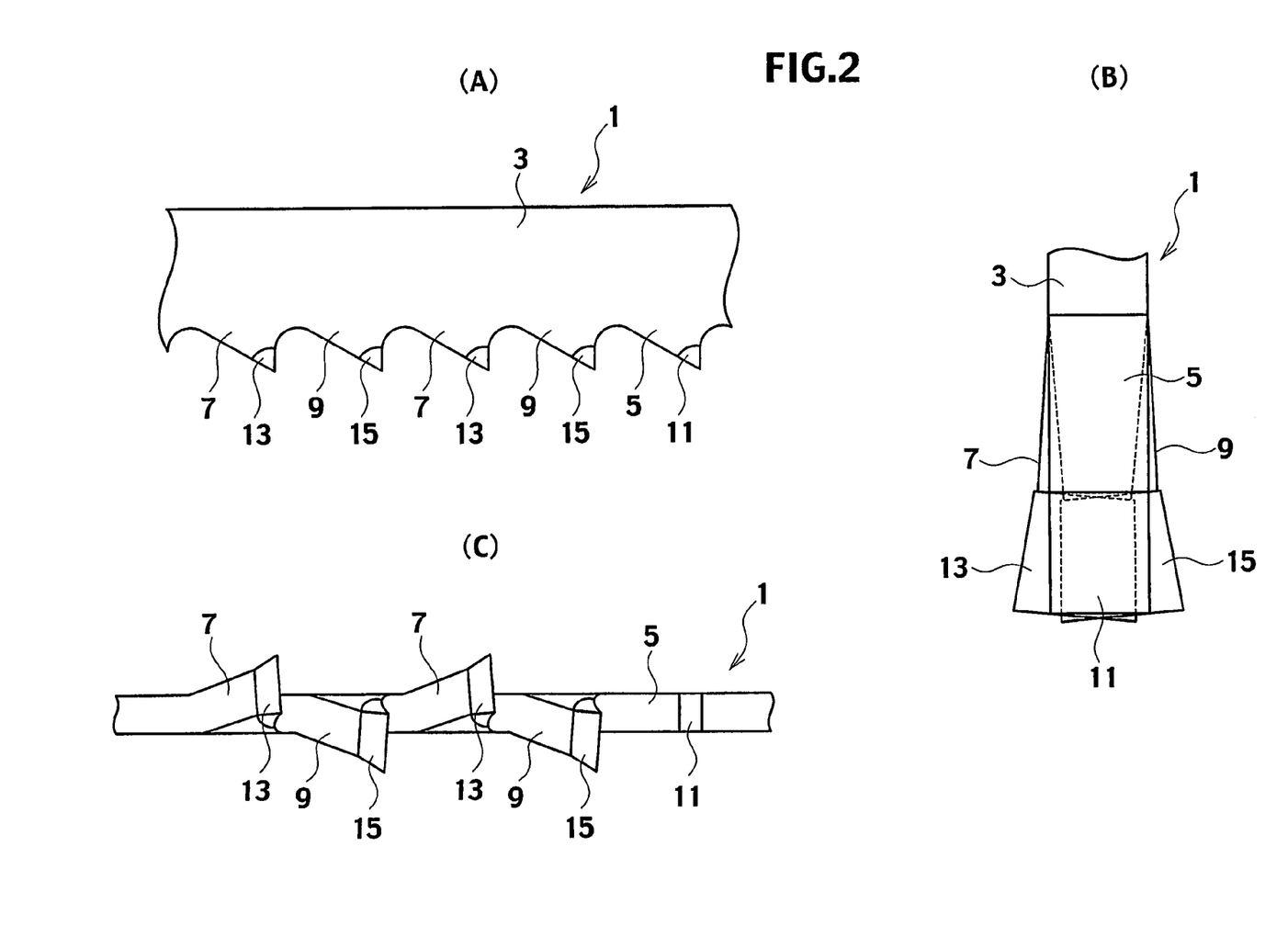
FIGS. 2A, 2B and 2C are views explanatory of a saw blade in a second preferred embodiment according to the invention.

Next, a saw blade in a second preferred embodiment will be described in reference to FIGS. 2A to 2C. In the second preferred embodiment, constituent elements exhibiting the same functions as those of the constituent elements in the above-described first preferred embodiment are designated by the same reference numerals, and therefore, duplicated explanation will be omitted below.

The first preferred embodiment is featured by the combination pattern consisting of the three teeth, that is, the straight tooth 5 and one pair of left and right set teeth 7 and 9. In contrast, left and right set teeth 7 and 9 are alternately disposed, so that a combination pattern consists of five teeth, that is, a straight tooth 5 and two pairs of left and right set teeth 7 and 9 as a whole. In this manner, with the plural pairs of left and right set teeth 7 and 9, a load to be exerted on the set teeth 7 and 9, each having the function of making a width of a cutting groove at a workpiece W greater than a lateral thickness of the straight tooth 5, can be dispersed when the workpiece is cut, thereby suppressing respective corners 13C and 15C outside of the set teeth 7 and 9 from being abraded.

Furthermore, at the left and right set teeth 7 and 9 for cutting the workpiece in order to enlarge the cutting groove at the workpiece, a laterally partial force exerted on the subsequent pair of left and right set teeth 7 and 9 becomes smaller than that exerted on the preceding pair of left and right set teeth 7 and 9, thereby enhancing the cutting precision of a cutting surface (i.e., a cut face) of the workpiece.

As has been already understood, the combination pattern consisting of the straight tooth 5 and one pair of left and right set teeth 7 and 9 may consist of the arbitrary number of each of straight teeth 5 and left and right set teeth 7 and 9.

Figure 3:
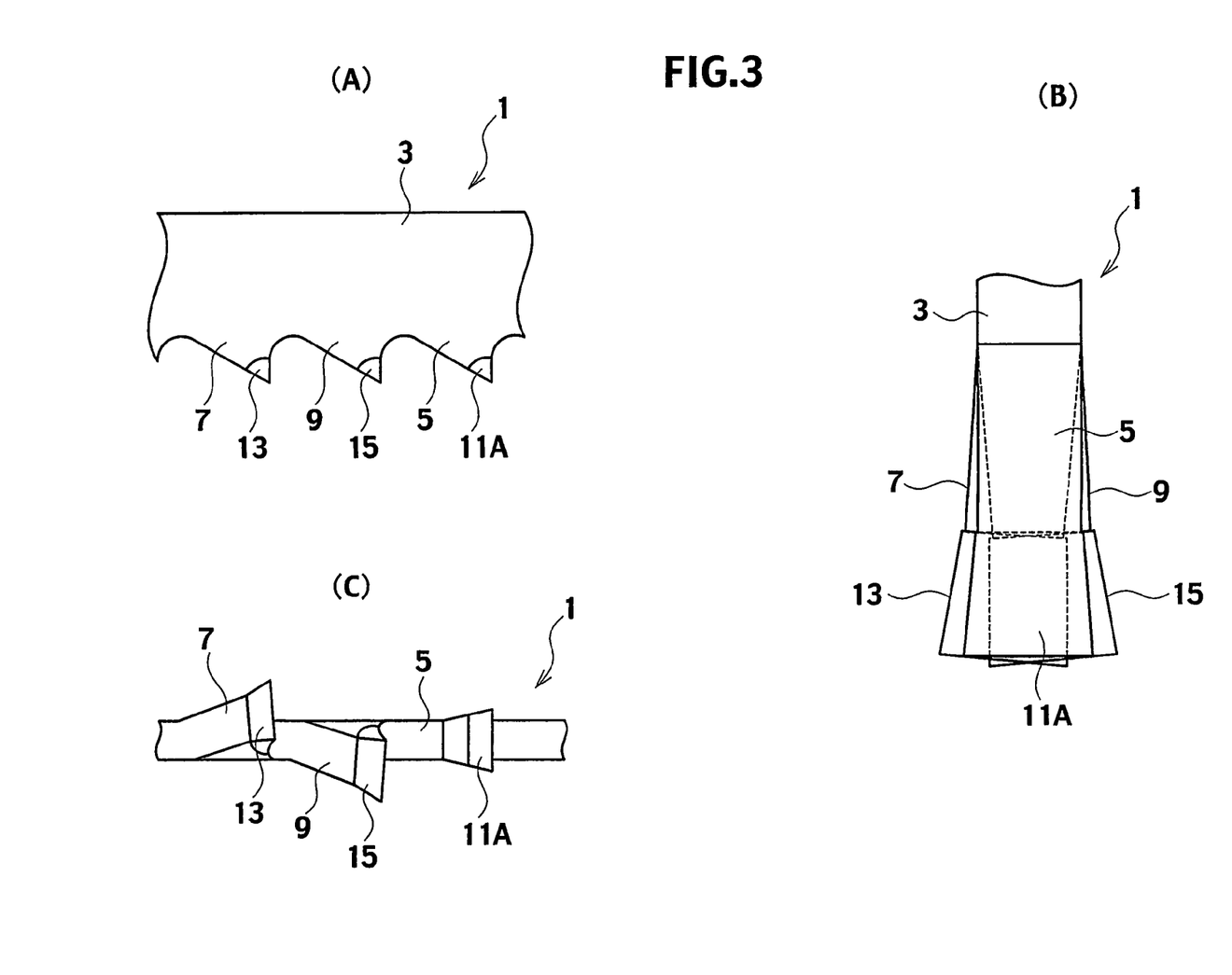
FIGS. 3A, 3B and 3C are views explanatory of a saw blade in a third preferred embodiment according to the invention.

FIGS. 3A to 3C are views explanatory of a saw blade in a third preferred embodiment according to the invention. Constituent elements exhibiting the same functions as those of the constituent elements in the above-described saw blade 1 are designated by the same reference numerals, and therefore, duplicated explanation will be omitted below.

In the third preferred embodiment, the chip 11A on a tooth tip disposed at a straight tooth 5 is formed into a trapezoidal shape (i.e., a dovetail shape) in cross section, like chips 13 and 15 on tooth tips disposed at left and right set teeth 7 and 9. Namely, the straight tooth 5 is constituted of a dovetail shaped straight tooth.

The third preferred embodiment can produce the same effect produced in the above-described first and second preferred embodiments. When a workpiece is cut by a saw blade 1 with application of a pressing force to the saw blade 1 in a cutting direction (wherein the workpiece is cut downward in FIGS. 3A and 3B), the chip 11A on the tooth tip disposed at the straight tooth 5 is formed into the dovetail shape even in the case where the saw blade 1 has the tendency of slight inclination in a lateral direction due to cutting resistance in the cutting direction, thereby suppressing a contact of left and right side surfaces of the chip 11A on the tooth tip with a cutting groove formed at the workpiece.

Consequently, when the saw blade 1 has the tendency of inclination in the lateral direction, it is possible to suppress the laterally partial force exerted on the saw blade 1 as reaction force generated by the contact of the saw blade 1 with the workpiece, so as to suppress breakage or bending caused by the laterally partial force exerted on the saw blade 1. In other words, it is possible to enhance straight stability of the saw blade 1, and thus, to prolong the lifetime of the saw blade 1. Incidentally, also in the present preferred embodiment, the number of each of straight teeth 5 and left and right set teeth 7 and 9 may be arbitrary.

Figure 4:
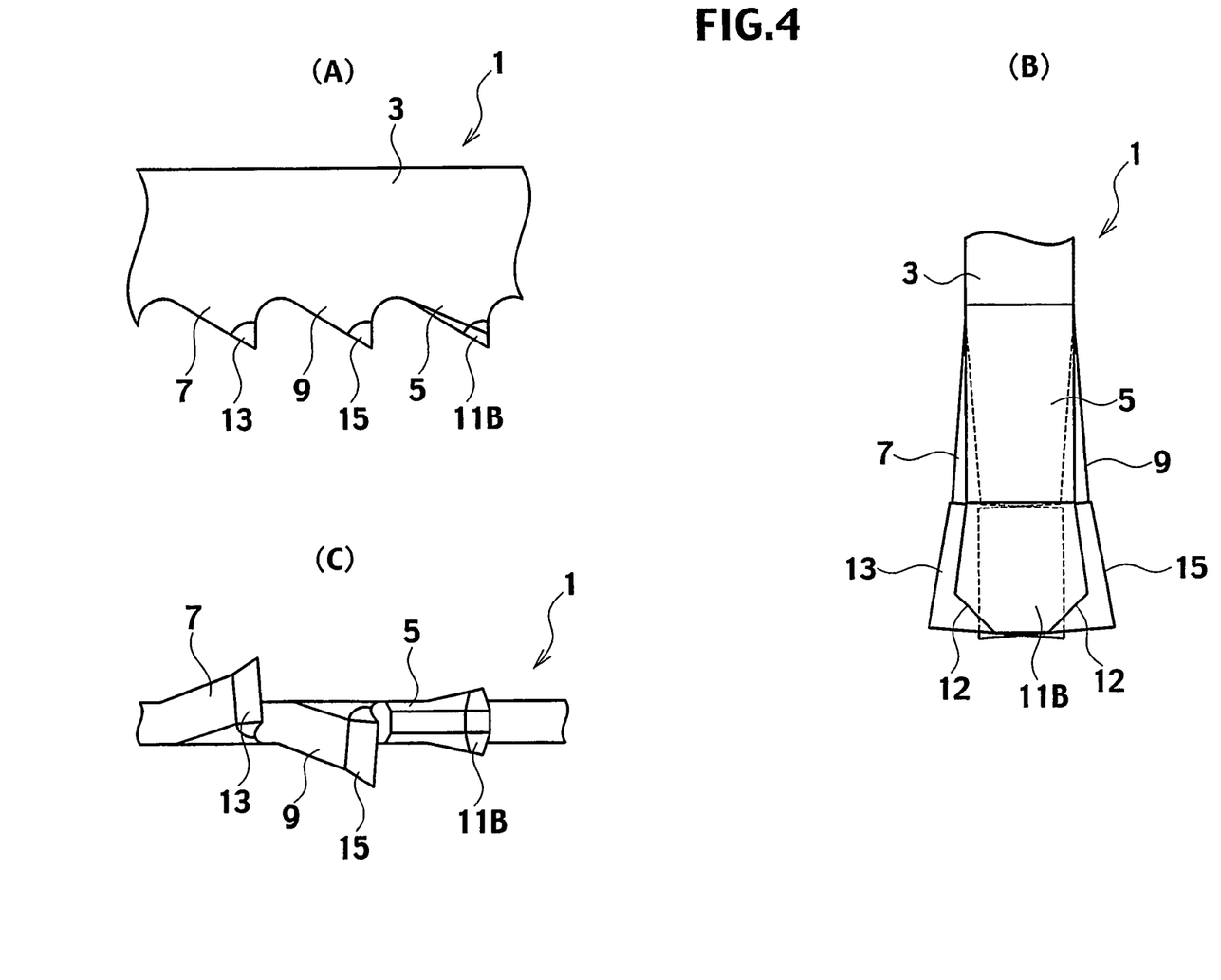
FIGS. 4A, 4B and 4C are views explanatory of a saw blade in a fourth preferred embodiment according to the invention.

FIGS. 4A to 4C are views explanatory of a saw blade in a fourth preferred embodiment. Constituent elements exhibiting the same functions as those of the constituent elements in the above-described preferred embodiments are designated by the same reference numerals, and therefore, duplicated explanation will be omitted below.

In the fourth preferred embodiment, a chip 11B on a tooth tip disposed at the straight tooth 5 is formed into a bevel-dovetail shape in cross section, in which the chip 11B on the tooth tip is provided with inclinations 12 on both of left and right sides, by forming the inclinations 12 on both of the left and right sides at the tooth tip of the chip 11A on the tooth tip in the above-described third preferred embodiment. Namely, the straight tooth 5 is constituted of a bevel-dovetail shape straight tooth provided with the inclinations on both of the left and right sides at the tooth tip formed into the dovetail shape gradually enlarging in a lateral direction on the side of the tooth tip.

With the above-described configuration, the lateral width of the tooth tip of the chip 11B on the tooth tip can be reduced by forming the inclinations 12 on both of the left and right sides at the tooth tip of the chip 11B on the tooth tip disposed at the straight tooth 5, thereby enhancing a biting property with respect to a workpiece. Moreover, with the configuration in which the inclinations 12 are formed on both of the left and right sides, a groove formed into a trapezoidal shape in cross section is formed at a bottom of a cutting groove at the workpiece cut by the chip 11B on the tooth tip, thus restricting movement in the lateral direction so as to enhance straight stability in a cutting direction. In other words, the lifetime of the saw blade can be prolonged.

Figure 5:
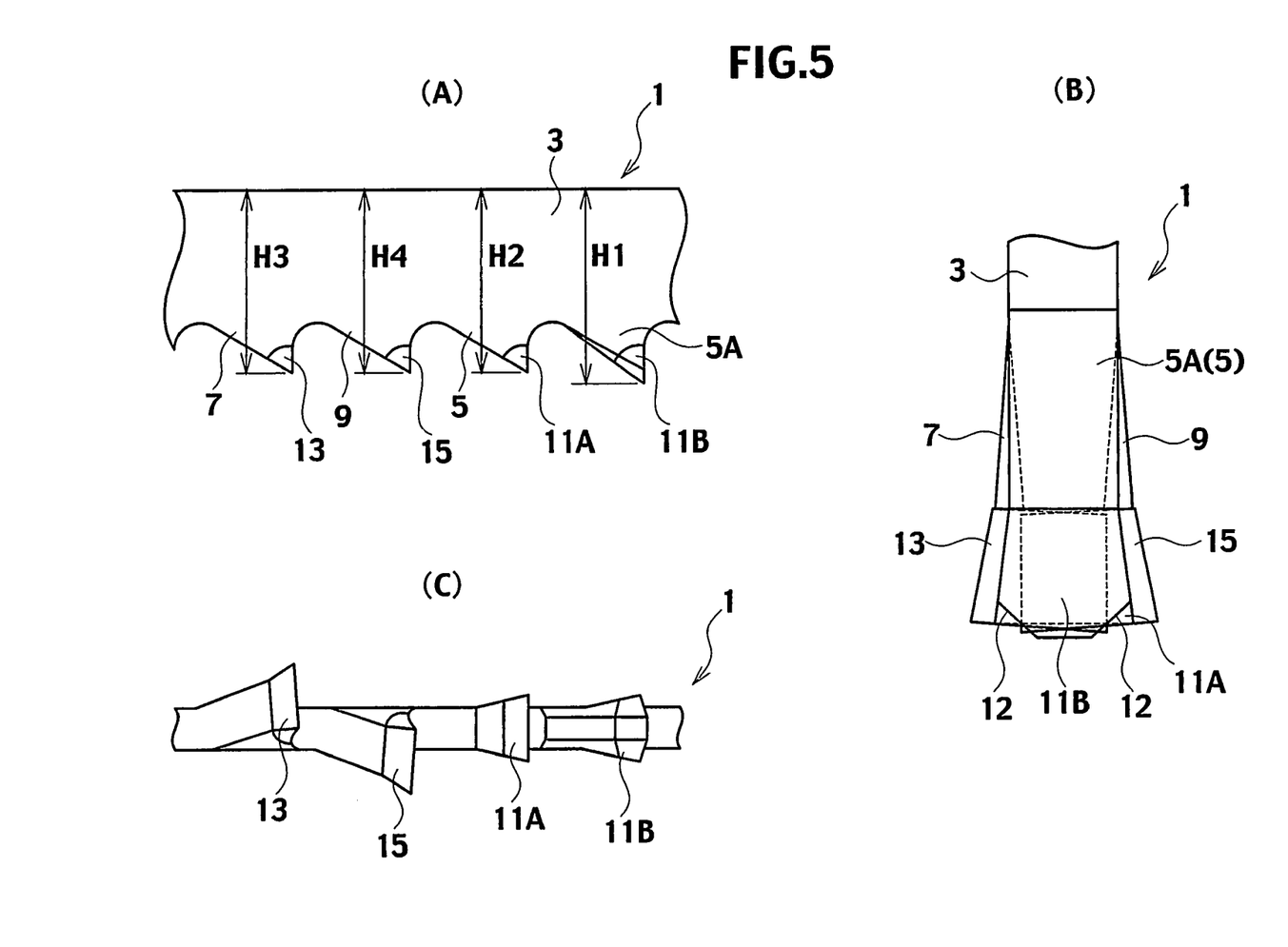
FIGS. 5A, 5B and 5C are views explanatory of a saw blade in a fifth preferred embodiment according to the invention.

FIGS. 5A to 5C are views explanatory of a saw blade in a fifth preferred embodiment. Constituent elements exhibiting the same functions as those of the constituent elements in the above-described saw blade 1 are designated by the same reference numerals, and therefore, duplicated explanation will be omitted below.

The fifth preferred embodiment is configured such that a preceding straight tooth 5A is additionally provided in the configuration in the above-described third preferred embodiment (see FIGS. 3A to 3C), and further, that the straight tooth 5A is provided with a bevel-dovetail shaped chip 11B on a tooth tip.

When H1 designates the height of the straight tooth 5A, H2 denotes the height of a straight tooth 5, and H3 and H4 designate the heights of left and right set teeth 7 and 9, respectively, the relationship is established as follows: H1>H2, H3, H4. Here, the relationship H2≧H3=H4 is established among the respective heights H2, H3 and H4 of the straight tooth 5 and the left and right set teeth 7 and 9.

As a consequence, with the above-described configuration, a groove is cut at a workpiece by the chip 11B on the tooth tip at the straight tooth 5A serving as a preceding tooth, before a portion remaining due to inclinations 12 at the chip 11B on the tooth tip is cut by a chip 11A on a tooth tip at the subsequent straight tooth 5, and thereafter, the lateral outside of a groove cut by the chip 11A on the tooth tip is cut by the left and right set teeth 7 and 9. Thus, a cutting groove is cut in such a manner as to be enlarged as a whole.

That is to say, with the above-described configuration, a load can be dispersed to the chips 11B, 11A, 15 and 13 on the tooth tips in cutting the workpiece, and further, cutting dust produced during the cutting work can be fined.

Thus, it is possible to alleviate cutting resistance to be exerted on each of the saw teeth and enhance straight stability of the saw blade, so as to solve the above-described problems experienced in the prior art. Incidentally, the relationship H2≦H3, H4 may be established among the respective heights H2, H3 and H4 of the straight tooth 5 and the left and right set teeth 7 and 9.

Figure 6:
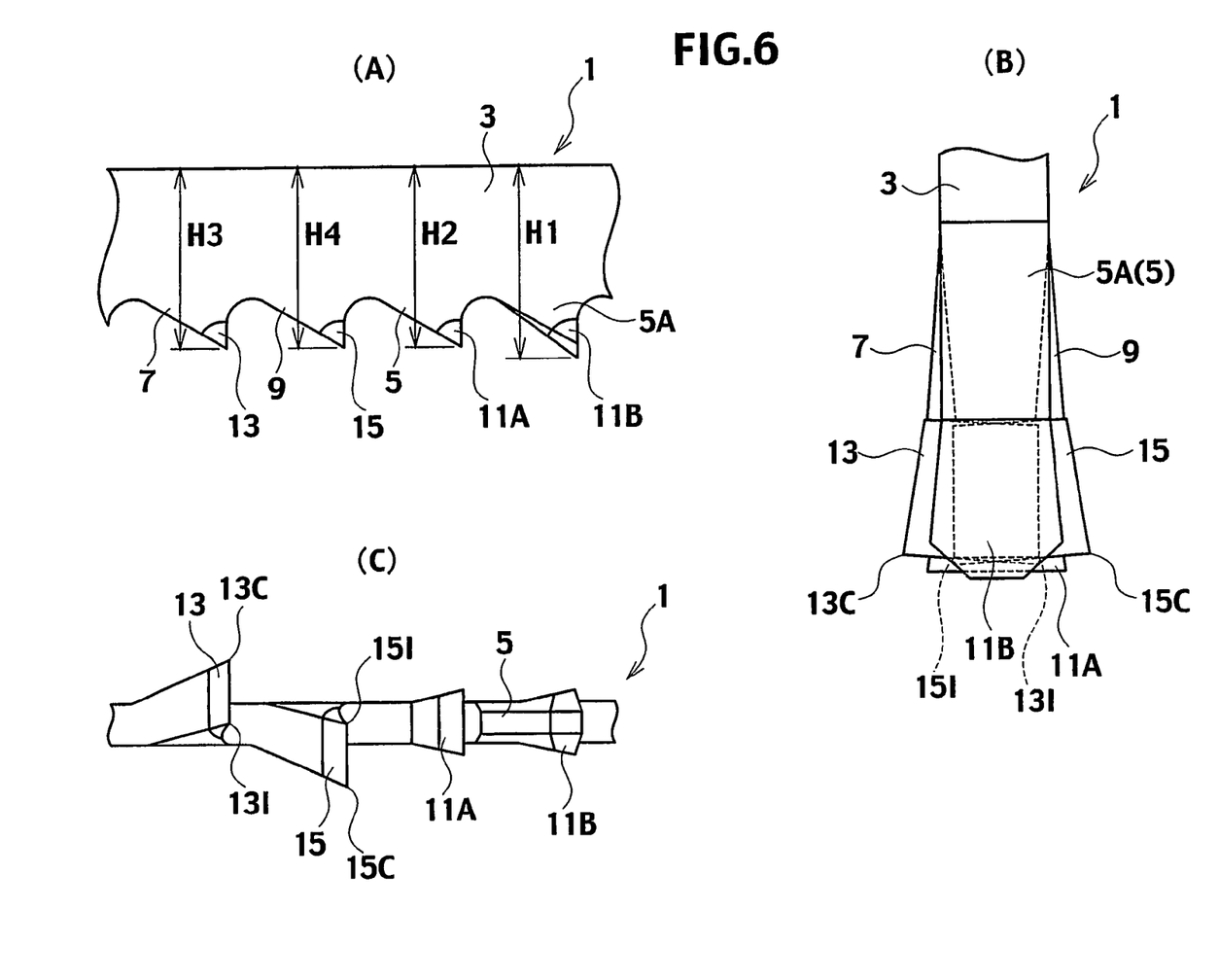
FIGS. 6A, 6B and 6C are views explanatory of a saw blade in a sixth preferred embodiment according to the invention.

FIGS. 6A to 6C are views explanatory of a saw blade in a sixth preferred embodiment. Constituent elements exhibiting the same functions as those of the constituent elements in the above-described preferred embodiments are designated by the same reference numerals, and therefore, duplicated explanation will be omitted below.

In the sixth preferred embodiment, the relationship H1>H2>H3, H4 is established among the respective heights H1, H2, H3 and H4 of the straight teeth 5A and 5 and the left and right set teeth 7 and 9.

Consequently, the above-described configuration can produce the same effect produced in the fifth preferred embodiment. Moreover, inside corners 13I and 15I at chips 13 and 15 on tooth tips at the left and right set teeth 7 and 9 (i.e., corners on a side opposite to outside corners 13C and 15C, respectively) are located inside of a movement trace depicted when chips 11A and 11B on tooth tips at the straight teeth 5 and 5A are moved in a cutting direction.

Thus, the chips 11B and 11A on the tooth tips at the straight teeth 5A and 5 precede in a cutting direction when a workpiece is cut. As a consequence, it is possible to avoid a load from being concentrated on the inside corners 13I and 15I at the chips 13 and 15 on the tooth tips at the left and right set teeth 7 and 9 when the workpiece is cut, and further, to prevent any chipping at the corners 13I and 15I. A bad balance in a lateral direction is tended to induce breakage or bending in the case where the inside corners 13I and 15I at the chips 13 and 15 on the tooth tips at the left and right set teeth 7 and 9 non-uniformly project. However, such a problem can be avoided by the above-described configuration.

Figure 7:
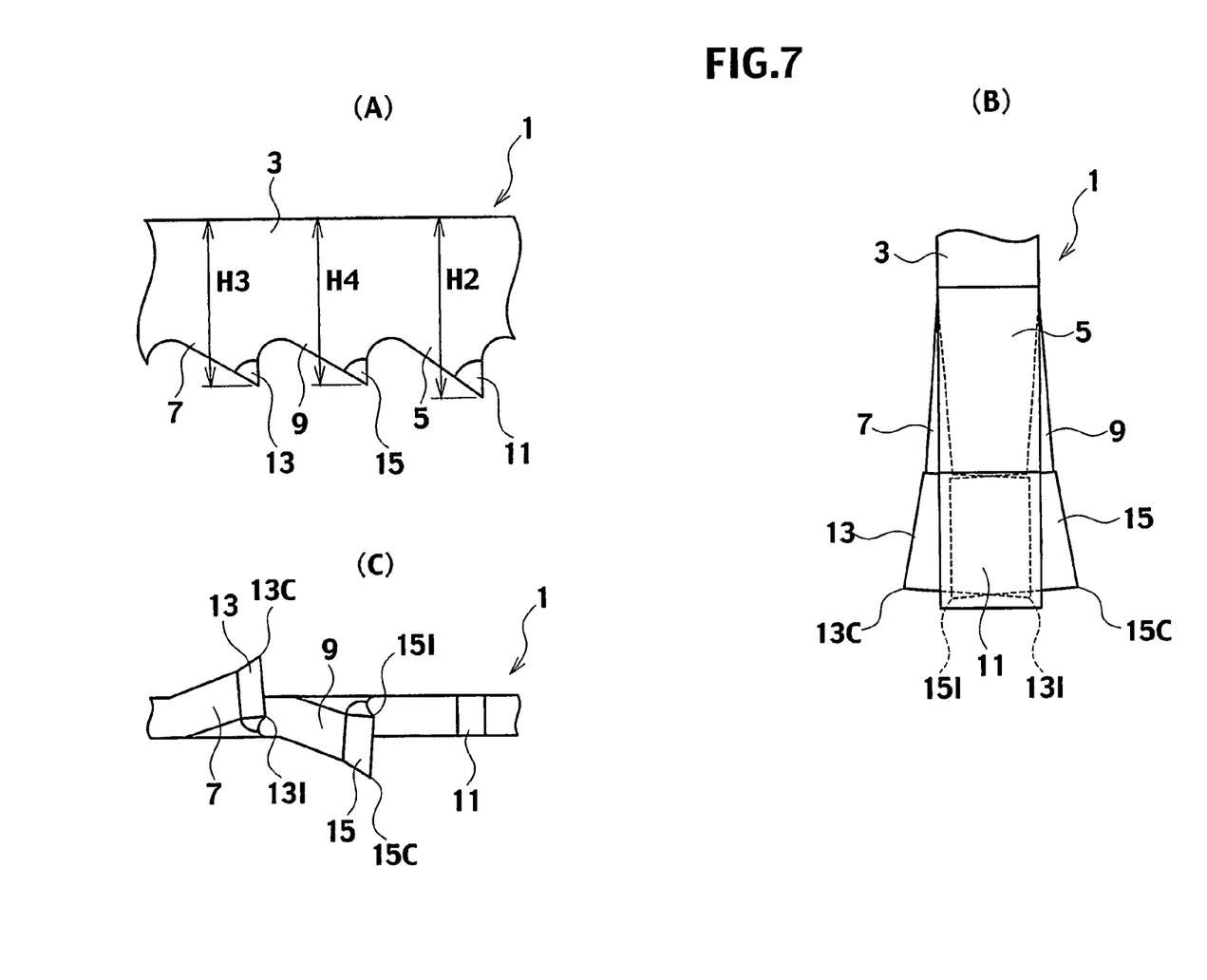
FIGS. 7A, 7B and 7C are views explanatory of a saw blade in a seventh preferred embodiment according to the invention.

FIGS. 7A to 7C are views explanatory of a saw blade in a seventh preferred embodiment. Constituent elements exhibiting the same functions as those of the constituent elements in the above-described preferred embodiments are designated by the same reference numerals, and therefore, duplicated explanation will be omitted below.

The seventh preferred embodiment is configured such that inside corners 13I and 15I at chips 13 and 15 on tooth tips at left and right set teeth 7 and 9 are located on the back side of a chip 11 on a tooth tip at a straight tooth 5 (i.e., within the movement trace of the chip 11 on the tooth tip) by making the height H2 of the straight tooth 5 greater than the heights H3 and H5 of the left and right set teeth 7 and 9 in the above-described third preferred embodiment (see FIGS. 3A to 3C), as shown in FIG. 7B. Consequently, the configuration can produce the same effect produced in the above-described preferred embodiment.

Figure 8:
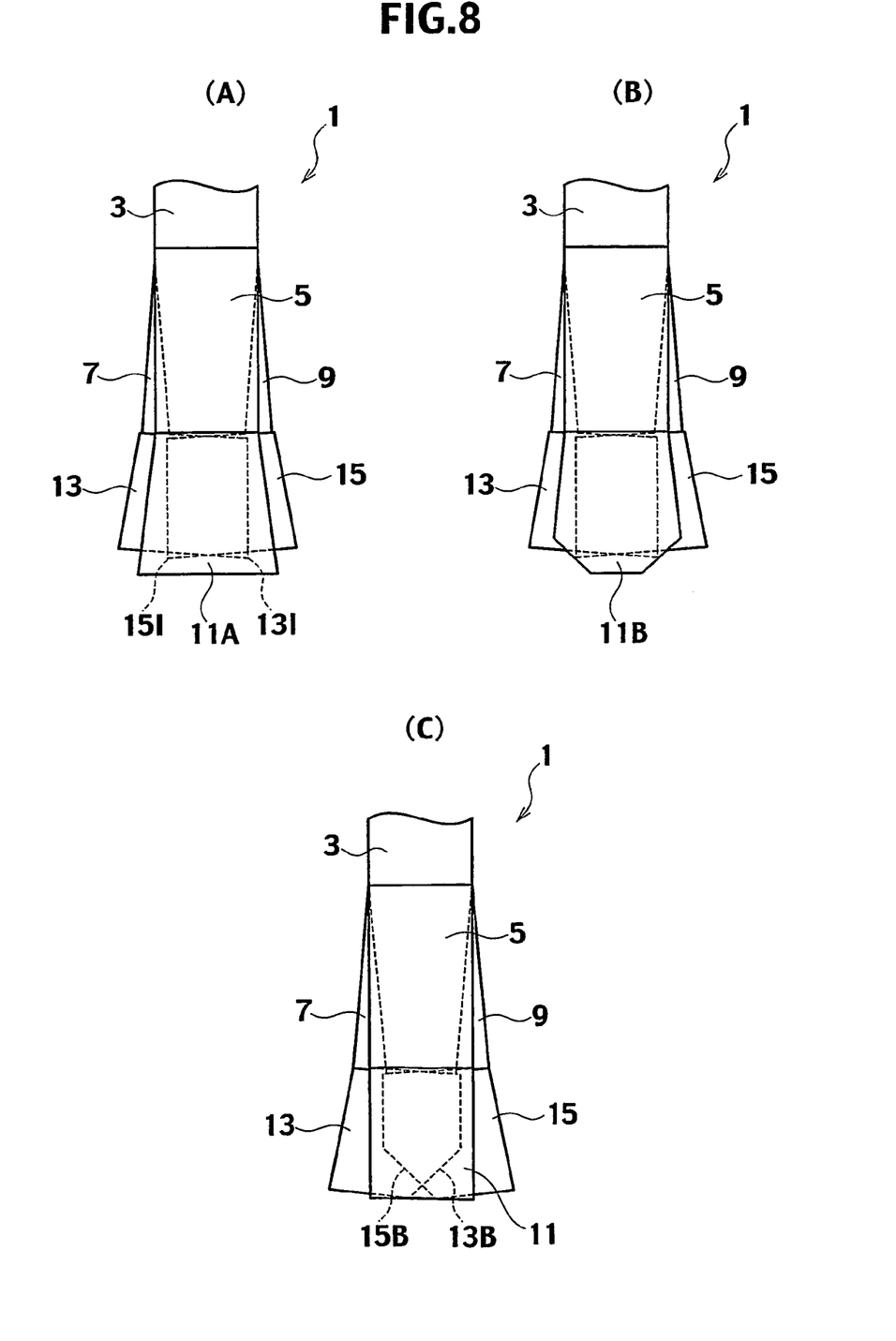
FIGS. 8A, 8B and 8C are views explanatory of the saw blade in modifications of the seventh preferred embodiment according to the invention.

In the preferred embodiment shown in FIGS. 7A to 7C, the chip 11 on the tooth tip at the straight tooth 5 may be configured in a chip 11A or 11B on a tooth tip shown in FIGS. 8A and 8B, respectively. Otherwise, in a configuration in which the heights of the straight tooth 5 and the left and right set teeth 7 and 9 are substantially equal to each other, as shown in FIG. 8C, inclined surfaces 13B and 15B may be formed by removing the inside corners at the chips 13 and 15 on the tooth tips at the left and right set teeth 7 and 9.

This configuration also can produce the same effect produced in the above-described preferred embodiments.

Figure 9:
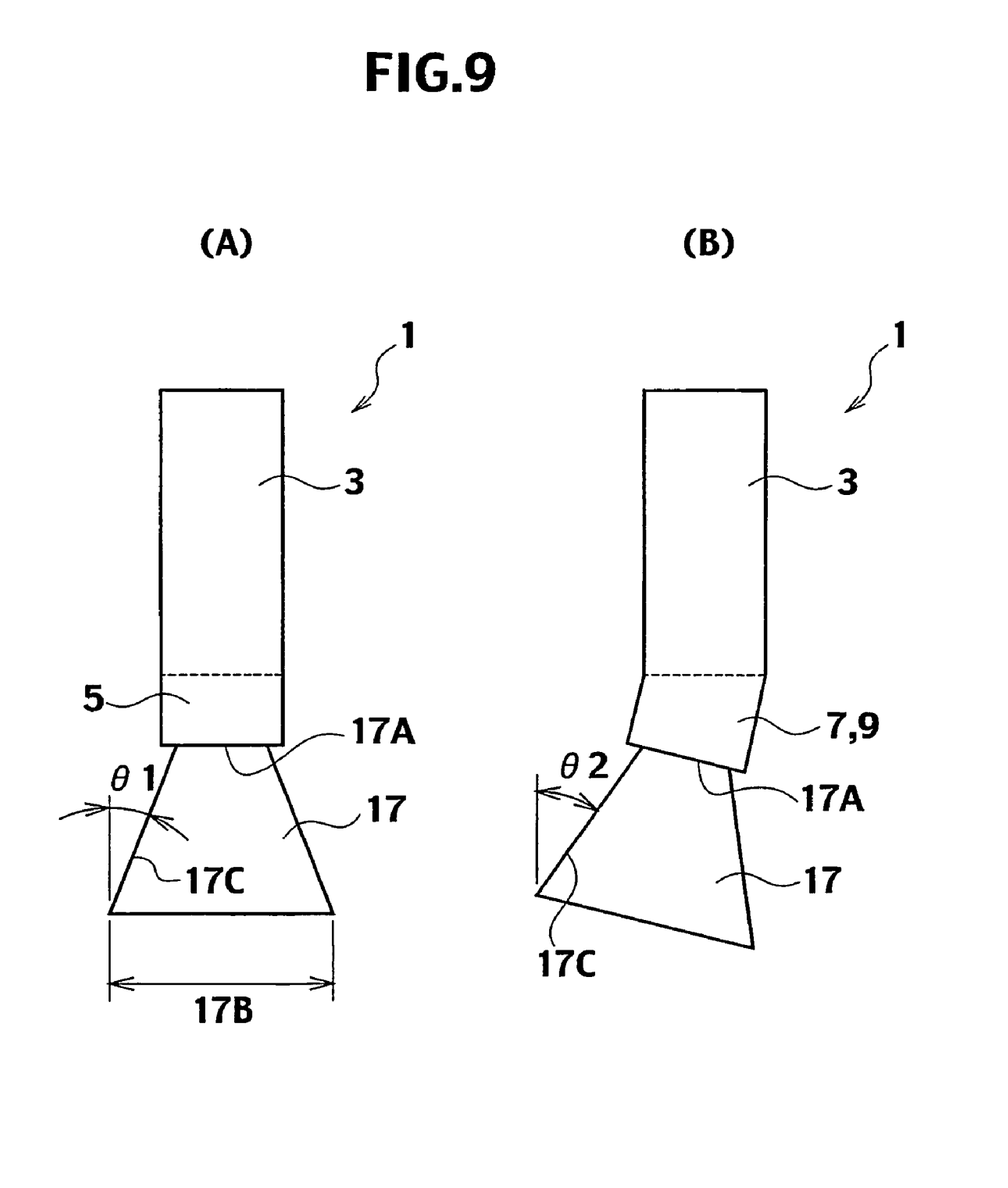
FIGS. 9A and 9B are views explanatory of a straight tooth and set teeth in a saw blade in modifications.

FIGS. 9A and 9B are conceptual and schematic views explanatory of a straight tooth and left and right set teeth in a saw blade 1 in modifications. That is to say, in the present preferred embodiment, the thickness of a joint portion 17A of a dovetail shaped chip 17 on a tooth tip is made to be smaller than those of a straight tooth 5 and left and right set teeth 7 and 9 in the saw blade 1.

With the above-described configuration, an inclination angle θ1 in a vertical direction of left and right side surfaces 17C at the chip 17 on the tooth tip can be more increased in the case where a thickness 17B and a height on a tip side of the chip 17 on the tooth tip are constant. As a consequence, an inclination angle θ2 at the side surface 17C at the chip 17 on the tooth tip at the time of a setting work becomes equal to the sum of the inclination angle θ1 before the setting work and a setting angle at the time of the setting work, as shown in FIG. 9B, thereby providing the inclination angle greater than that in the above-described preferred embodiment. Thus, it is possible to more effectively prolong the lifetime of the saw blade 1.

Incidentally, it is to be understood that the invention should not be limited to the above-described preferred embodiments, and therefore, that the invention can be carried out in other modes with appropriate variations and alterations.

The entire contents disclosed in Japanese Patent Application No. 2002-297928 (filed on Oct. 10, 2002) are encompassed in the specification of the application of the invention by reference.

The invention claimed is:

1. A saw blade provided with numerous cutting teeth for cutting a workpiece at appropriate pitches, the saw blade comprising:
    left and right set teeth, which are set in a lateral direction, as viewed in a cutting direction of the cutting teeth;
    wherein each of the left and right set teeth is a dovetail shaped set tooth having a tooth tip which is gradually enlarged in the lateral direction in addition to being set, each of the left teeth having a left side surface at the dovetail shaped portion and each of the right teeth having a right side surface at the dovetail shaped portion, so that each inclination angle of the left side surface and the right side surface is increased as a result of both the dovetail shape and set of the tooth tip; and
    a straight tooth, which is not set in the lateral direction, as viewed in the cutting direction of the cutting teeth,
    wherein the straight tooth including a dovetail shaped straight tooth having a tooth tip which is gradually enlarged in the lateral direction, and
    wherein an upper surface of each tooth, including the tooth tip, defines a planar inclined surface.

2. A saw blade according to claim 1, wherein a height of each of the left and right set teeth is smaller than or substantially equal to that of the straight tooth.

3. A saw blade according to claim 1, wherein an inclination is formed at an inside corner on a tooth tip side of each of the left and right set teeth.

4. A saw blade according to claim 1, wherein the cutting teeth are configured by joining a dovetail shaped chip to the tip end of the tooth in a blade base; and
   wherein the thickness of the chip at the joint portion is made to be smaller than that of the tip end of the tooth.

5. A saw blade provided with numerous cutting teeth for cutting a workpiece at appropriate pitches, the saw blade comprising:
   left and right set teeth, which are set in a lateral direction, as viewed in a cutting direction of the cutting teeth;
   wherein each of the left and right set teeth is a dovetail shaped set tooth having a tooth tip which is gradually enlarged in the lateral direction in addition to being set, each of the left teeth having a left side surface at the dovetail shaped portion and each of the right teeth having a right side surface at the dovetail shaped portion, so that each inclination angle of the left side surface and the right side surface is increased as a result of both the dovetail shape and set of the tooth tip; and
   a straight tooth, which is not set in the lateral direction, as viewed in the cutting direction of the cutting teeth,
   wherein the straight tooth including a bevel-dovetail shaped straight tooth having inclinations at both of left and right ends of a tooth tip which is gradually enlarged in the lateral direction, and
   wherein an upper surface of each tooth, including the tooth tip, defines a planar inclined surface.

6. A saw blade according to claim 5, wherein a height of each of the left and right set teeth is smaller than or substantially equal to that of the straight tooth.

7. A saw blade according to claim 5, wherein the inclination is formed at an inside corner on a tooth tip side of each of the left and right set teeth.

8. A saw blade according to claim 5, wherein the cutting teeth are configured by joining a dovetail shaped chip to the tip end of the tooth in a blade base; and
   wherein the thickness of the chip at the joint portion is made to be smaller than that of the tip end of the tooth.

* * * * *